P. P. HARING.
COTTON PICKER.
APPLICATION FILED SEPT. 6, 1913.

1,176,891. Patented Mar. 28, 1916.
2 SHEETS—SHEET 1.

Attest:
Ewd L. Tolson
C. E. Parsons

Inventor:
Peter Paul Haring,
by Spear, Middleton, Donaldson & Spear
Attys.

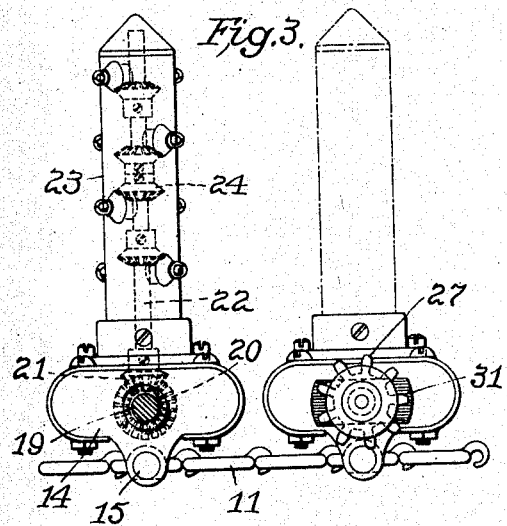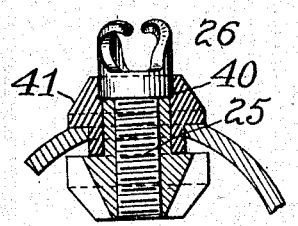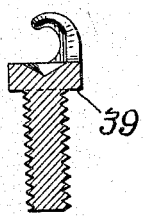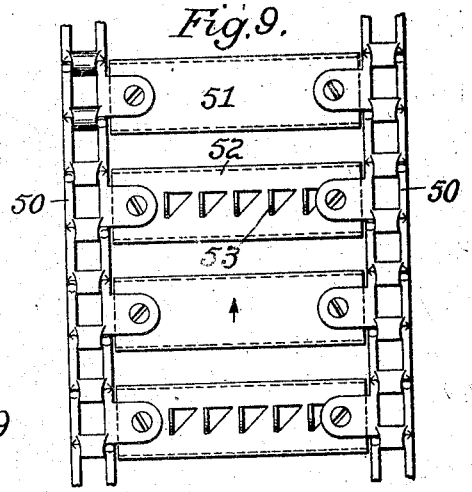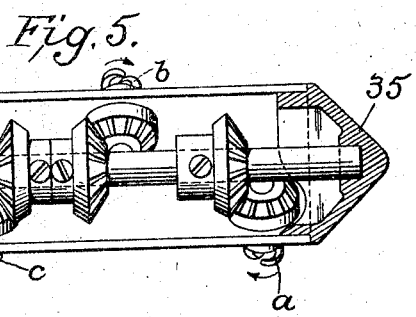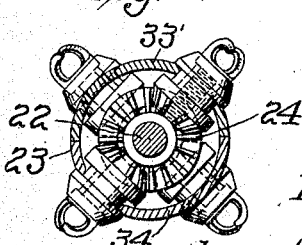

UNITED STATES PATENT OFFICE.

PETER PAUL HARING, OF GOLIAD, TEXAS.

COTTON-PICKER.

1,176,891.      Specification of Letters Patent.      Patented Mar. 28, 1916.

Application filed September 6, 1913. Serial No. 788,467.

*To all whom it may concern:*

Be it known that I, PETER PAUL HARING, a citizen of the United States, residing at Goliad, Texas, have invented certain new and useful Improvements in Cotton-Pickers, of which the following is a specification.

My invention relates to cotton picking machines and it involves a two wheeled structure carrying two drums or endless chains of slats, upon which the picker arms are mounted, said drums being arranged on each side of the pathway for the plants so that as the machine is drawn forward the endless chain of slats will be given a traveling movement to make the picker arm traverse the pathway for the slats, so that the picker fingers will come into contact with the plant.

The invention consists in the features and combination and arrangement of parts hereinafter described and particularly pointed out in the claims.

Figure 1:
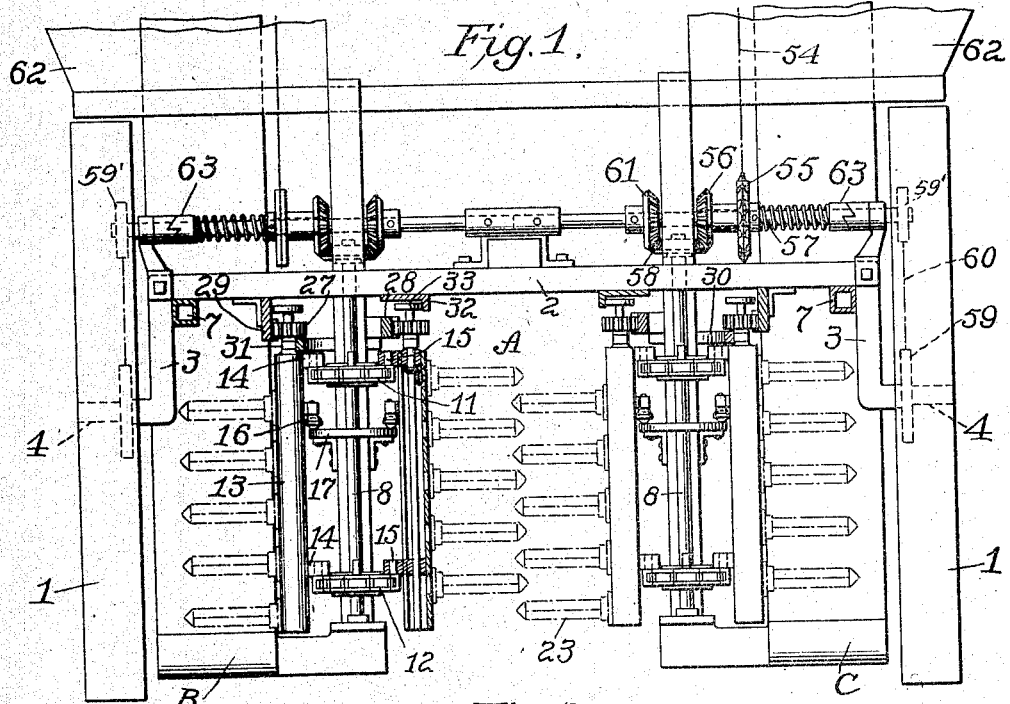
Figure 2:
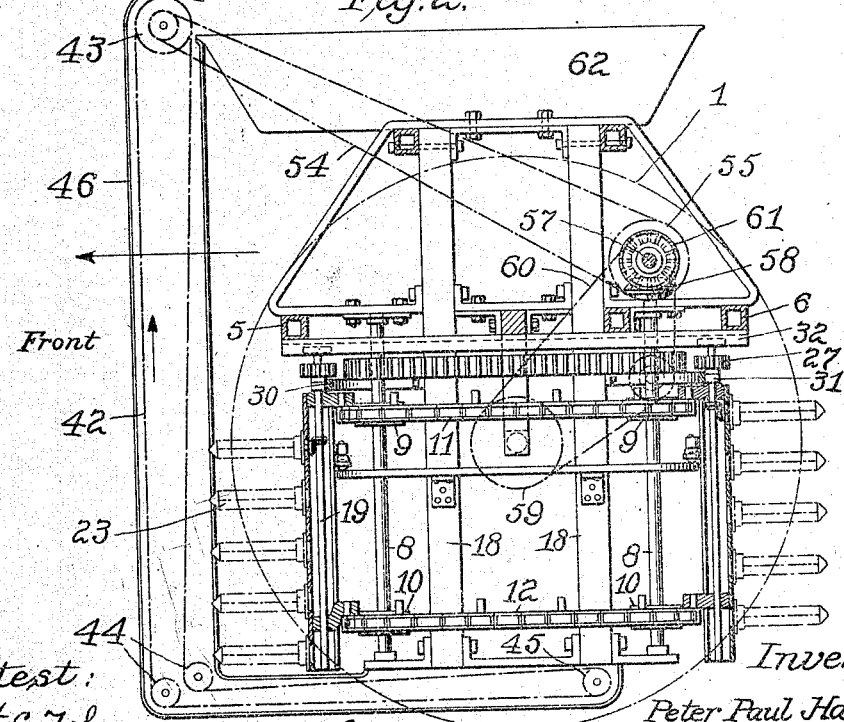

In the accompanying drawings:—Figure 1 is a rear view of the machine with parts in section, the seat for the driver being omitted and some of the parts being broken away. Fig. 2 is a sectional view through one of the endless chains of slats taken from front to rear with parts shown in elevation. Fig. 3 is a plan view showing one picker arm complete and another in dotted lines with their slats and the carrier chain to which they are pivotally connected. Fig. 4 is a vertical sectional view through a portion of one of the slats and showing a portion of the picker arm partly in section with gearing for driving the picker spindles. Fig. 5 is a plan view of the lower portion or section of the tubular picker arm with parts in section. Fig. 6 is a transverse sectional view of the picker arm with parts in elevation. Fig. 7 is a detailed view of a picker finger with associated parts in section. Fig. 8 is a detailed sectional view of the picker finger detached. Fig. 9 is an elevation of a portion of the elevator for the cotton.

In these drawings 1 indicates the carrying wheels mounted on the frame which includes an axle member 2 having at its end depending arms 3 on which are mounted the journals 4 for the carrying wheels. The frame work also includes transverse bars 5, 6 and longitudinal bars 7. In this frame work are mounted, on each side of the plant pathway A, a pair of vertical shafts 8, one shaft of each pair being mounted at the front and the other at the rear of the machine. At the upper and lower portions of these shafts sprocket wheels 9, 10 are mounted, about which pass upper and lower sprocket chains 11 and 12. These sprocket chains support and carry tubular slats 13, said slats having ears 14 extending therefrom and perforated to fit over upwardly extending pins 15 on the sprocket chains, so that the slats may be attached by simply slipping the ears 14 down over the pins 15. The weight of the slats is taken off from the sprocket chains by rollers 16 bearing upon a track 17 suitably secured to the uprights 18 of the frame work. The slats are of tubular form and each has a shaft 19 journaled therein and extending vertically, to which shaft are fixed beveled gears 20, meshing with similar gears 21 fixed on shafts 22 extending lengthwise of the picker arms 23, which picker arms are secured to the tubular slats and extend horizontally therefrom. The shafts 22 carry beveled gears 24 fixed thereon, meshing with similar gears on the shanks 25 of the picker fingers 26. The shanks are screw threaded and the gears are threaded onto these shanks.

In order to drive the vertical shafts 19 they have gears 27 fixed near their upper ends to mesh with racks fixed on the machine frame. One of these racks is indicated at 28 to engage the inner periphery of the gears, that is the periphery toward the center of the drum or endless series of slats, while on the opposite side of the drum or chain of slats the gear 27 meshes with a rack 29 which is located to engage the outer periphery of the gears. By this arrangement the picker fingers will be rotated in one direction as the picker arms carry them along the pathway A for the plant, and when any slat is on its return movement on the outside of the drum or endless chain of slats the picker fingers will be rotated in a reverse direction so as to withdraw from the cotton, this forward rotation and reverse rotation resulting from the pinion 27 engaging first the inner rack 28 and then the outer rack 29.

In order to hold the vertical shafts 19 against rotation, as soon as the gear leaves the rack 28 so that it will engage the rack 29 properly, I provide a locking track or cam at 30 fixed on the frame and adapted to be engaged by a cam or locking member 31 fixed on the shafts 19. These parts may be similar to those shown at 50—51 Fig. 7 of my Patent 796421, Aug. 8, 1905 and form no part of my present invention.

In order to hold the gears 27 in engagement with the rack 28, I provide a guard rail or track 32 fixed on the frame, which is engaged on its outer side by a roller 33 fixed on the shaft 19, there being one of these rollers on each shaft. This track 32 will keep the gears 27 in mesh with the racks 28. No such guard rail is needed in respect to the rack 29 because this is on the outer side of the gear 27.

The picker arms, as shown in Figs. 5 and 6, are cylindrical in cross section and are composed of an upper and a lower section 33', 34, which sections are secured to the cap piece 35 and an interior bearing 36, and its beveled gears are so located in respect to the gears of the picker fingers that, for instance the picker fingers $a$ and $b$, shown in Fig. 5 will rotate toward the right while the picker fingers $c$ and $d$ will rotate toward the left in the direction of the arrows. The threading of the shanks 25 of the picker fingers is of course, in such direction that there will be no tendency for the gears to work off of the threaded shanks under the strain of twisting the cotton from the plant. The picker arms may either be fixed to the slate or they may be mounted to rotate in their bearings on the slats, as shown in Fig. 4, in which a gear 37 is attached to the shell of the picker arm and is engaged by a gear 38 on the vertical shaft within the slat, by which construction the picker arm is slowly rotated to carry its picker fingers over a wider field of operation. The picker fingers are shouldered at 39 and the head portions above these shoulders fit in sockets 40 in cones 41 suitably mounted in the shell of the picker arm and preferably the head of the picker spindle is about flush with the outer surface of the cone. The purpose of this construction is to more readily discharge the cotton.

In order to collect the cotton as it drops from the picker fingers, which dropping is due to the reverse rotation of the picker fingers when they are rotated through engagement of the gears 37 with the rack 29, I provide an elevator at the front of the machine, on each side of the plant pathway, these elevators being generally indicated in Fig. 1 at B, C. As shown in Fig. 2, each elevator consists of an endless carrier 42 passing around an upper roll 43 and about guide rolls 44 and thence horizontally toward the rear and about a guide roller 45, the endless carrier being inclosed in a casing 46. This endless carrier, as shown in detail in Fig. 9, consists of sprocket chains 50 to which are attached plates or cross pieces 51, 52, preferably of thin channeled metal, every other plate having struck therefrom a series of teeth or projections 53, adapted to engage the cotton and elevate it. The elevator is driven in the direction of the arrow, Fig. 2, through a belt or chain 54, passing around the sprocket wheel 55, attached to a gear 56, loose on the shaft 57, the said gear 56 deriving its motion from a gear 58 fixed on one of the vertical shafts 8. The shaft 57 is driven from the carrying wheels through the sprocket wheels and chain 59, 59', 60, and said shaft has fixed thereto the gear 61 meshing with gear 58, by which mechanism the vertical shaft 8 is driven to cause the traveling movement of the chain of slats with their picker arms, and by gear 56 the belt 54 is driven in the proper direction to cause the elevator belt to lift the cotton and discharge it into the receptacle 62, there being one of these receptacles on each side of the machine. Suitable clutches are placed at 63 in the shaft 57 so that one carrier wheel may rotate in advance of the other in turning, the clutches being yieldable automatically.

I claim as my invention:—

1. In combination in a cotton picker, the chains of slats carrying picker arms, each slat having a vertical shaft with gearing thereon, picker spindles mounted on the arm and driven from the said gearing, a gear on the shaft of each slat, a fixed rack meshing with the gear on its inner side adjacent the pathway for the plant, a fixed rack to mesh with said gears on their outer side for reversing the picker spindles and discharging the cotton, rollers on the vertical shafts and a guard rail on the opposite side of the rollers from that on which the rack is located for holding the gears in mesh with the rack adjacent the plant pathway, substantially as described.

2. In combination with the traveling slats, picker arms mounted to rotate in bearings on said slats, vertical shafts carried by the slats, gearing between the vertical shafts and the picker arms for rotating them, picker fingers mounted on the picker arms and gearing between the picker fingers and the vertical shafts for operating said fingers, substantially as described.

3. In combination in a cotton picking machine, a picker arm, a picker finger having a screw threaded shank, a gear screw threaded onto said shank and means for operating the gear, substantially as described.

4. In combination a picker arm, cones in the picker arm having each an opening extending therethrough with a counterbore at the outer end of said opening, picker fingers mounted on a head seated in said counterbore, said fingers having each a shank extending through the cone and a gear on the inner end of said shank, substantially as described.

5. In combination in a cotton picker, upper and lower carrier chains each having upwardly extending projections, vertical slats each having a pair of laterally extending ears, one ear of each pair being near the upper portion of the slats and reaching over the upper carrier chain and the other ear of each pair being located near the lower portion of its slat and reaching over the lower chain, said ears having openings to fit down over the projections to hold the slats to the chains and to permit their disengagement from both chains by lifting them, picker arms carried by the slats, picker fingers on the arms, and means for operating the picker fingers, the said slats lying and moving in a path out beyond the circuit of the carrier chains, substantially as described.

In testimony whereof, I affix my signature is presence of two witnesses.

PETER PAUL HARING.

Witnesses:
A. R. FRANKE,
H. B. CAMPBELL.